March 29, 1966     R. SCHMIDT     3,242,694

TORQUE TRANSMITTING SYSTEM

Filed Oct. 27, 1964     11 Sheets-Sheet 1

INVENTOR
RICHARD SCHMIDT

BY *Cushman, Darby & Cushman*
ATTORNEYS

March 29, 1966    R. SCHMIDT    3,242,694
TORQUE TRANSMITTING SYSTEM
Filed Oct. 27, 1964    11 Sheets-Sheet 2

INVENTOR
RICHARD SCHMIDT

BY
Cushman, Darby & Cushman
ATTORNEYS

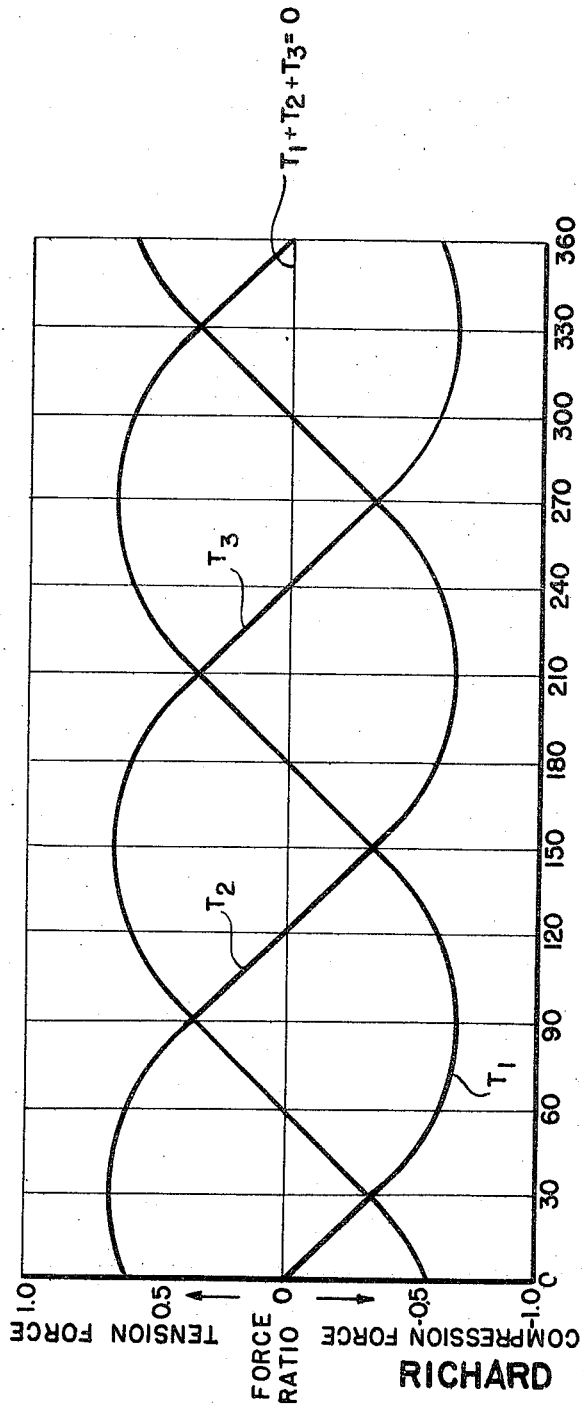

March 29, 1966  R. SCHMIDT  3,242,694
TORQUE TRANSMITTING SYSTEM
Filed Oct. 27, 1964  11 Sheets-Sheet 4
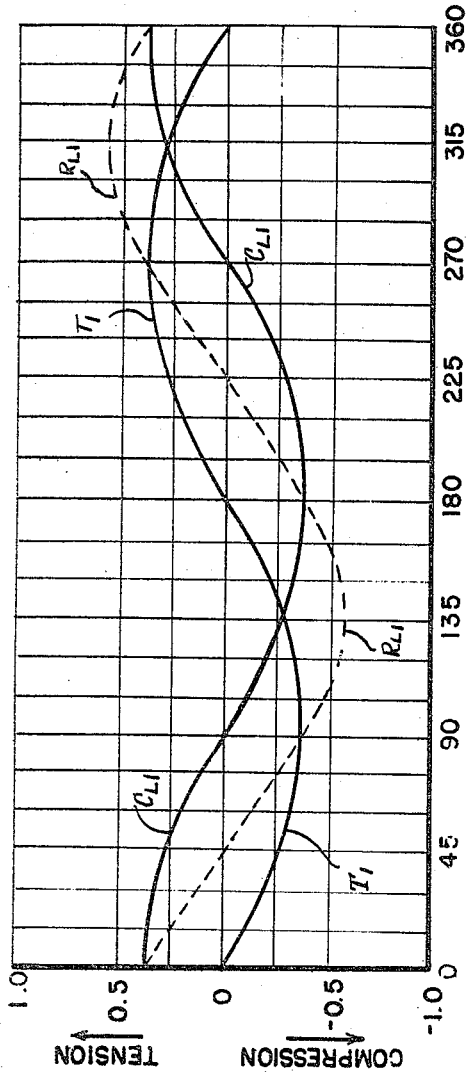
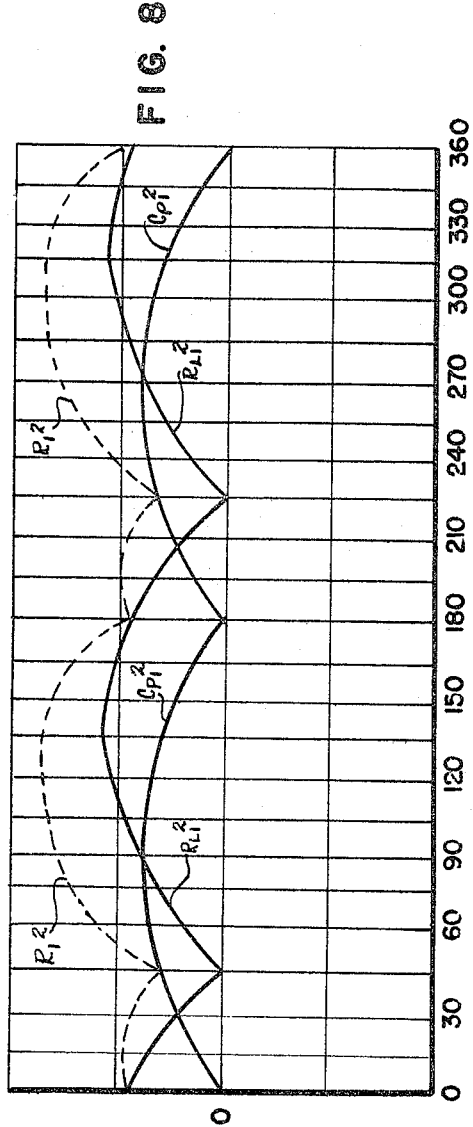
INVENTOR
RICHARD SCHMIDT March 29, 1966  R. SCHMIDT  3,242,694
TORQUE TRANSMITTING SYSTEM
Filed Oct. 27, 1964
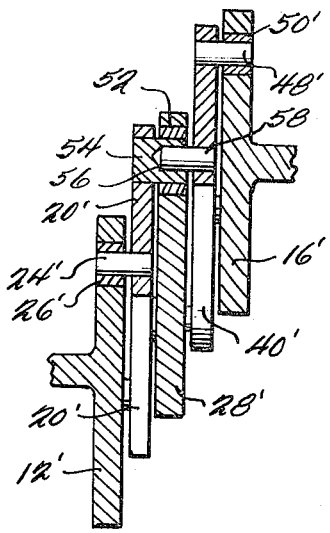
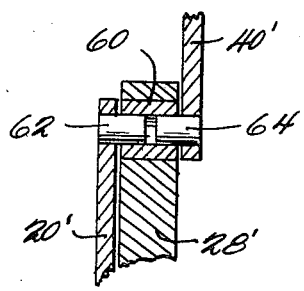
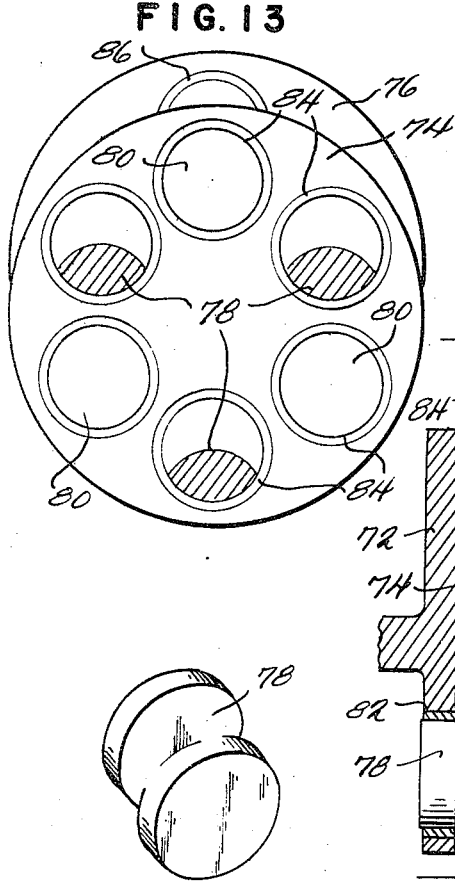
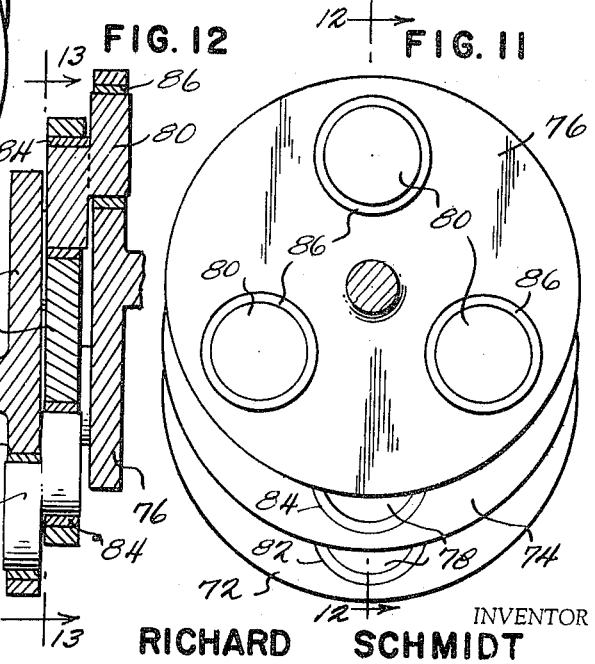
INVENTOR
RICHARD SCHMIDT

INVENTOR
RICHARD SCHMIDT

BY
ATTORNEYS

March 29, 1966 R. SCHMIDT 3,242,694
TORQUE TRANSMITTING SYSTEM
Filed Oct. 27, 1964 11 Sheets-Sheet 7

INVENTOR
RICHARD SCHMIDT

March 29, 1966 R. SCHMIDT 3,242,694
TORQUE TRANSMITTING SYSTEM
Filed Oct. 27, 1964 11 Sheets-Sheet 8

INVENTOR
RICHARD SCHMIDT

BY Cushman, Darby & Cushman
ATTORNEYS

March 29, 1966 R. SCHMIDT 3,242,694
TORQUE TRANSMITTING SYSTEM
Filed Oct. 27, 1964 11 Sheets-Sheet 9

INVENTOR
RICHARD SCHMIDT

BY *Cushman, Darby & Cushman*
ATTORNEYS

INVENTOR
RICHARD SCHMIDT

March 29, 1966    R. SCHMIDT    3,242,694
TORQUE TRANSMITTING SYSTEM
Filed Oct. 27, 1964    11 Sheets-Sheet 11

INVENTOR
RICHARD SCHMIDT

BY
Cushman, Darby & Cushman
ATTORNEYS

United States Patent Office 3,242,694
Patented Mar. 29, 1966

3,242,694
TORQUE TRANSMITTING SYSTEM
Richard Schmidt, Rte. 3, Box 5–145, Madison, Ala.
Filed Oct. 27, 1964, Ser. No. 406,696
10 Claims. (Cl. 64—19)

This application constitutes a continuation-in-part of my co-pending application Serial No. 294,026, filed July 10, 1963, now abandoned. The present invention relates to torque transmitting mechanisms and more particularly to a torque transmitting mechanism embodying an improved torque transmitting device capable of transmitting high speed-high torque rotary motion, as from a motor or the like, to a driven instrumentality, such device providing for relative transverse movement during such high-speed high torque rotary movement.

The present invention has applicability in any torque transmitting system where relatively high torque rotary motion is transmitted between two rotary members which are movable relative to each other in a direction transverse to their axes.

The objectionable nature of the tunnel in the middle of the rear floor of an automobile is well-known and there have been many efforts made to eliminate this objectionable feature. Some of these have been adopted but they likewise raise entirely different problems. In general, it can be stated that these modifications involve the elimination of a rigid rear axle assembly and its suspension and the independent mounting and suspension of the rear drive wheels. This, of course, constitutes a substantial redesign of the entire rear suspension of the vehicle and new problems are presented with respect to the drastically modified rear suspension.

An object of the present invention is the provision of an automotive drive assembly which is embodied in a conventional rigid rear axle assembly suspension and serves to materially reduce, if not eliminate, the floor tunnel which has heretofore been provided in automotive vehicles embodying such conventional rigid rear axle assembly suspensions.

In accordance with the present invention the swingable drive shaft assembly whose vertical swinging movement necessitates the provision of the tunnel is replaced by a drive shaft assembly which is mounted on the vehicle frame in fixed relation in a position beneath the frame and a torque transmitting device capable of accommodating relative vertical movement between the drive shaft fixed with respect to the frame and the input shaft of the differential unit of the rear axle assembly is provided in the space between the rear end of the fixed drive shaft and the rear axle assembly rearwardly of the rearward floor board so that the latter may be relatively flat.

The torque transmitting device of the present invention embodied in the automotive vehicle transmission system of the present invention, as indicated above, is capable of transmitting high speed-high torque rotary motion between two generally parallel shafts, the ends of which are spaced relatively close together. Conventionally, a unit consisting of a splined shaft assembly having universal joints at each end thereof is used to fill such requirements. A universal joint splined shaft assembly has inherent limitations with respect to the angle through which the splined shaft may be pivoted or swung with respect to the axis of the input or output shaft. Where this angle is too steep there is presented a problem of binding and hence the likelihood of a complete failure of the entire drive assembly.

Moreover, a torque transmitting device which is utilized in a high speed-high torque rotary transmission system, such as that presented in an automotive vehicle, must be capable of transmitting torque, while at the same time permitting movement in a direction transverse to the axis of the output shaft, in such a way that the high torque forces and centrifugal forces present do not cause excessive wear or breakdown and further in such a way that the movement of the output shaft in a direction transverse to its axis of rotation does not result in substantial change in the angular velocity of rotation.

Accordingly, it is an object of the present invention to provide a transmitting system embodying a high torque motor, a driven instrumentality and a torque transmitting device of the type described operatively connected between the motor and the driven instrumentality for transmitting the high torque rotary movement of the motor to the driven instrumentality while permitting relative movement in a direction transverse to the axis of rotation of either the motor or the driven instrumentality.

In accordance with the principles of the present invention, a preferred embodiment of a torque transmitting device which may be utilized in the overall system of the present invention is made up of three rotary members which are interconnected by two sets of at least three links, the ends of which are pivotally mounted to the rotary members about axes spaced equally within cylindrical planes of equal diameter concentric to the axis of rotation of the respective rotary members. A motion transmitting linkwork embodying a generally similar arrangement of parts for duplicating the rotary movement of the main actuating spindle of a trigonometrical computing device to a chart rule is known in the drafting implement art as disclosed in United States Patent 2,368,-813. However, this motion transmitting linkwork is not essentially a torque transmitting device and is basically distinguished from the present invention in this regard. A torque transmitting device embodying the principles of the present invention must embody sets of substantially identical links, each having a dimension measured in a direction perpendicular to their axes less than the distance between corresponding axes of adjacent links. It is contemplated that this limitation on the maximum lengths of the links of a torque transmitting device embodying the principles of the present invention is essential in order to provide proper torque force characteristics due to the torques which are transmitted and proper centrifugal force characteristics due to the rotational speeds transmitted.

Accordingly, it is a further object of the present invention to provide a torque transmitting device of the type described which is capable of transmitting high speed-high torque rotary motion between two shafts or other rotating instrumentalities which are spaced apart axially relatively close to one another and which are capable of relative transverse movement with respect to each other during operation. Further, the torque transmitting device of the present invention includes means for maintaining the driving and driven axes out of alignment with each other during operation of the device. This feature prevents an unbalanced orbiting of an intermediate rotary member which would otherwise take place if the two shafts were not prevented from becoming axially aligned.

Another object of the present invention is the provision of a torque transmitting device of the type described which, during operation, has a substantially constant resultant centrifugal force substantially equal to zero and a substantially constant resultant torque-transmitting-force substantially equal to zero and which is capable of transmitting high-speed, high-torque rotational movement of a first rotary member to a high speed-high torque rotational movement of substantially identical angular velocity of a second rotary member while permitting relative transverse movement between the axes of rotation of said rotary members.

Still another object of the present invention is the provision of a torque transmitting device of the type described which is constructed of conventional machine elements such as rotary members, connecting links, shafts, bearings and the like and is therefore capable of simple construction and trouble-free operation.

These and other objects of the present invention will become more apparent during the course of the following detailed description and appended claims.

The invention may best be understood with reference to the accompanying drawings wherein illustrative embodiments are shown.

In the drawings:

FIGURE 6 is a graph illustrating the change in the torque forces acting on the bearing of each link member throughout one revolution of the associated rotary member;

FIGURE 7 is a graph illustrating the change in the total force acting on the bearing of a link member along the longitudinal axis of the link member during one complete revolution of the associated rotary member obtained by adding the change in the torque force of FIGURE 6 to the change in the longitudinal component of the centrifugal force;

FIGURE 8 is a graph illustrating the change in the resultant force acting on a bearing of a link member throughout one revolution of the associated rotary member obtained by adding the change in the square of the total longitudinal force of FIGURE 7 to the change in the square of the centrifugal force component in a perpendicular direction;

FIGURE 9 is a vertical sectional view similar to FIGURE 3 of a modified form of a torque transmitting device embodying the principles of the present invention;

FIGURE 10 is an enlarged fragmentary vertical sectional view illustrating a further modified form of the device;

FIGURE 11 is an elevational view of still another modified form of a torque transmission device embodying the principles of the present invention;

FIGURE 12 is a sectional view taken along the line 12—12 of FIGURE 11;

FIGURE 13 is a sectional view taken along the line 13—13 of FIGURE 12;

FIGURE 14 is an enlarged perspective view of an integrated shaft type link member utilized in the torque transmitting device of FIGURES 11–13;

Figure 1:
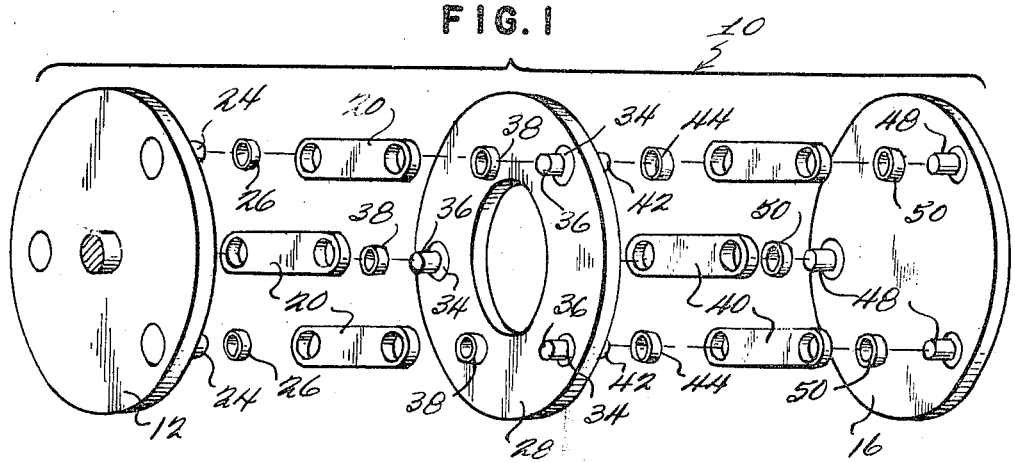
FIGURE 1 is an exploded perspective view of a torque transmitting device embodying the principles of the present invention.
Figure 2:
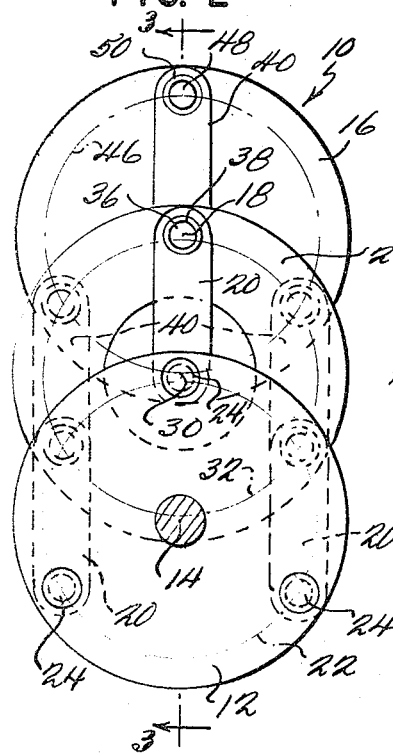
FIGURE 2 is a front elevational view of the torque transmitting device.

Referring now more particularly to FIGURES 1 through 4 of the drawings, there is shown therein a preferred embodiment of a torque transmitting device, generally indicated at 10, embodying the principles of the present invention. The torque transmitting device 10 comprises, in general, an input rotary member 12 of generally disc-shaped configuration having a central axis of rotation, indicated by the numeral 14, an output rotary member 16, also of generally disc-shaped configuration having a central axis of rotation, indicated by the numeral 18, and torque transmitting means between the rotary members permitting relative movement therebetween during rotation in a direction transverse to the axes of rotation of 14 and 18 thereof.

Figure 3:
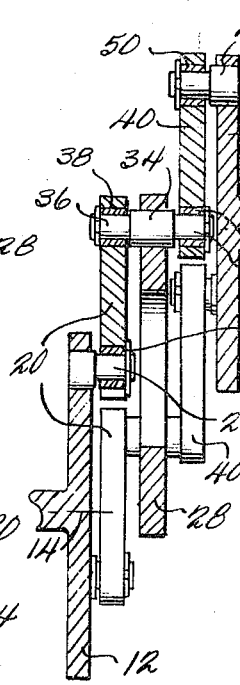
FIGURE 3 is a vertical sectional view taken along the line 3—3 of FIGURE 2.
Figure 4:
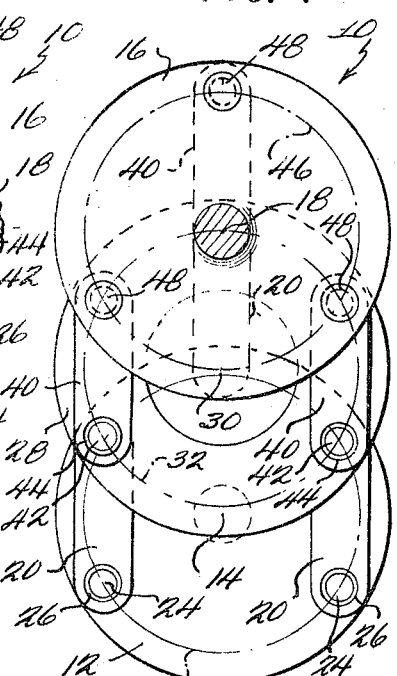
FIGURE 4 is a rear elevational view of the torque transmitting device.

As shown in FIGURES 1 through 4, the torque transmitting means of the device 10 includes a first set of at least three substantially identical link members 20, having one of the ends thereof rotatably connected with the rotary member 12 about axes spaced equally within a right cylindrical plane 22 concentric with the axis of rotation 14 of the rotary member 12. As best shown in FIGURE 3, each rotary connection is made up of a stub shaft member 24 fixedly secured within a suitable opening formed in the rotary member 12 and having its outer end portion engaged within a bearing 26 fixed within the adjacent end of the associated link member 20.

Disposed adjacent the link members 20 is an intermediate rotary member 28 of generally ring-like configuration having a central axis of rotation indicated by the numeral 30. The opposite ends of the link members 20 are rotatably connected with the intermediate rotary member 28 about axes spaced equally within a right cylindrical plane 32 concentric with the axis 30 and having a diameter equal to the diameter of the right cylindrical plane 22. As before, each rotary connection is made up of a stub shaft element 34 suitably fixed within the rotary member 28 and having an end portion 36 extending outwardly from one side thereof journaled within a bearing 38 fixed to the adjacent opposite end of the associated link member 20.

A second set of at least three link members 40 of identical construction substantially the same as the link members 20 is provided between the intermediate rotary member 28 and the output rotary member 16. One of the ends of the link members 40 is rotatably connected with the intermediate rotary member 28, as by stub shaft portions 42 extending outwardly from the stub shaft elements 34 in a direction opposite from the portions 36 and bearings 44 suitably fixed to the link members. Consequently, the pivotal axes provided by the stub shaft portions 42 and bearings 44 are disposed in equally spaced relation within the right cylindrical plane 32.

The opposite ends of the link members 40 are pivotally connected with the output rotary member 16 about axes spaced equally within a right cylindrical plane 46 concentric with the axis 18 and of a diameter equal to the diameter of the right cylindrical plane 32. As before, the rotatable connection is made by a stub shaft element 48 fixed within the rotary member 16 extending outwardly therefrom and journaled within bearings 50 suitably fixed in the opposite ends of the link members 40.

It will be understood that the rotary members 12 and 16 may be suitably connected in any torque transmitting system. The torque transmitting device 10 has particular utility in systems where the input and output rotary members are movable transversely with respect to each other during rotation and more particularly where such transverse movement is generally rectilinear. An important functional characteristic of the present torque transmitting device is that this relative transverse movement has no effect upon the angular velocity of rotation of the rotary members. The relative transverse movement is provided because the sets of link members form effectively two arms of a toggle linkage. Each set of link members provides for a relative circular orbital translational movement of each of the rotary members connected thereto about the rotational axes of the other. Thus, the axis of each rotary member is in effect the pivotal axis of an arm of a toggle linkage, the axis of the intermediate rotary member constituting the common axis of the toggle linkage. The distance between the axes of adjacent rotary members is equal to the distance between the axes of the links. Where the distance between the axes of the link members of one set is equal to the distance between the axes of the link members of the other set, as shown in FIGURES 1 through 4, the total relative transverse movement provided between the input axis and the output axis is defined by an area of a circle having a radius equal to twice the distance between the axes of any one link member. Stated differently, if the axis of the input rotary member is held stationary, the axis of the output rotary member can be moved into any point within that circle since the latter is capable of movement in a circle about an axis which, in turn, is capable of moving in a circle the radii of which are equal. Moreover, it will be seen that since the orbital movement of an intermediate rotary member about the input rotary member is translational and the orbital movement of the output rotary member about the intermediate rotary member is translational, any transverse movement of the output rotary member with respect to the input rotary member will likewise be translational. Consequently, the angular relationship of the rotary members remains the same and is unaffected by any relative translational movement so that if a constant angular velocity of rotation is imparted to the input rotary member, the intermediate and output rotary members will have a constant angular rotary movement and such constant angular rotary movement will not be changed when the axis of the output rotary member is moved transversely with respect to the axis of the input rotary member.

Figure 5:
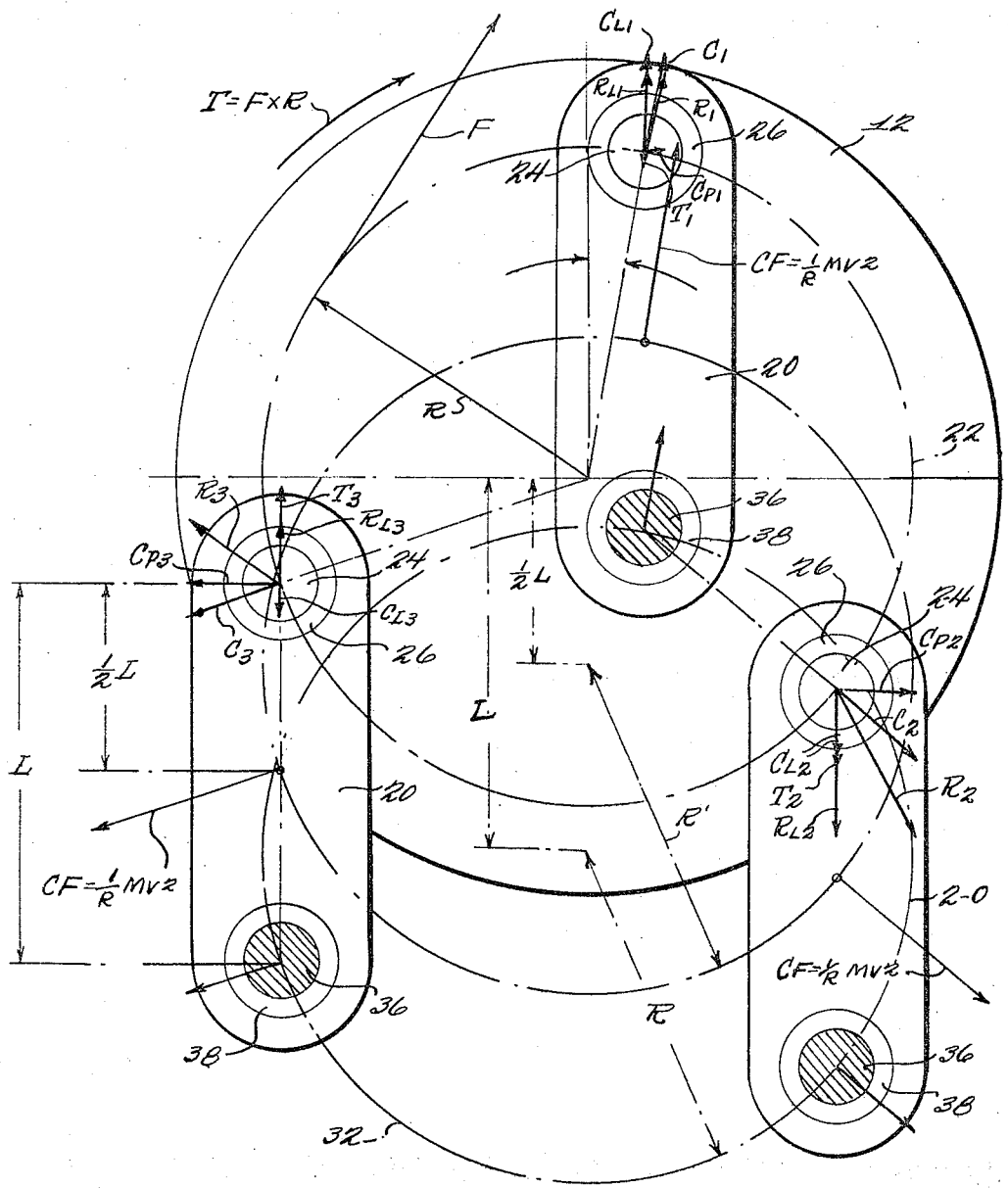
FIGURE 5 is a force diagram superimposed upon a vertical sectional view of one rotary member and one set of links of the torque transmitting device.

The dynamic torque transmitting characteristics of the device 10 are of particular significance. It is important that the rotational axes of the link members with respect to the rotary members be disposed in equally spaced relation within the right cylindrical planes concentric with the respective rotary members. Moreover, it is essential that at least three link members be utilized, although more than three may be used, if desired. By using at least three link members which are equally spaced with respect to each other, the torque forces of one rotary member are transmitted to the other rotary member in a balanced relationship. This relationship is evident from the force diagram shown in FIGURE 5 and is graphically shown in FIGURE 6. Referring first to FIGURE 5, it may be assumed that the rotary member has a torque T applied thereto which is equal to the force F times the radius R. This torque T will be transmitted to the link members through the bearings thereof in a direction through the axes of the links. Since each link member acts in the manner of a connecting rod, the force transmitted in any one link member during one complete revolution of the rotary member will vary as a sine wave. As shown in FIGURE 5, with the rotary member rotating in a clockwise direction and the axes of the links disposed in vertical planes, each link will have zero longitudinal or vertical force component when disposed at its uppermost or 12 o'clock position. Assuming this position to be a zero degrees angular position of rotation, it can be seen that each link increases in compressive force until it reaches a maximum at 90°. The compressive force will reduce in accordance with a sine wave function during the next 90° of rotation where it becomes zero again at 180°. That is, where the axis of the link is again in a vertical plane with respect to the axis of the rotary member. During the next quarter of revolution, the force in each link becomes a tensile force and increases with a sine wave function to a maximum at a position 270° from the zero position. In the last quarter of the revolution, the tensile force decreases along a sine wave function to zero at 360° or back to zero. Since the links are spaced equally apart angularly about the axis of the rotary member, the sine wave forces transmitted by each link are equal and out of phase with each other 120°. It can be seen by plotting the force T of each link during a revolution, in the manner shown in FIGURE 6, and then graphically adding these forces, that the resultant force transmitted to the rotary member by all of the links during any position of revolution is equal to zero. In this way, the torque forces transmitted by the link members from one rotary member to another are transmitted in a balanced fashion so that there are no forces which would set up an imbalance about the axis of rotation of the rotary member.

A second important dynamic characteristic of the present torque transmitting device is that the centrifugal forces of the link members are likewise maintained in a balanced condition. The centrifugal force CF created as a result of the rotary movement of each link member will be equal to the mass $m$ of the link member times the square of its velocity $v$ and divided by the radius R of the cylindrical planes of the rotational axes of the link members. In this regard, it is important that the link members be of substantially identical construction so that their masses are substantially equal. Again referring to FIGURE 5, it will be noted that since the link members are symmetrical about a parallel plane one-half the distance L between their axes, the center of gravity C.G. of the link members will be disposed in such plane.

It will also be noted that the center of gravity of each link member moves in a circular path whose radius is equal to the radius R of the cylindrical planes of the rotational axes of the link members. The centrifugal force CF of each link member acts in a direction extending radially outwardly from the center of the circular path and this centrifugal force is transmitted one-half to one bearing of the link member and one-half to the other bearing of each link member. Thus, at each bearing there is a centrifugal force, designated C in FIGURE 5, which acts in a radial direction with respect to the axis of rotation of the rotary member. Since the axes of the link members are spaced equally about the axis of the rotary member, and the C force of all link members is equal, the resultant of the centrifugal forces C about the axis of rotation of the rotary member are equal to zero.

In view of the above, it can be seen that the link members dynamically transmit the torque T from one rotary member to the adjacent rotary member without any tendency to impart an imbalance to the axes of the rotary members. Consequently, the bearings for the input and output rotary members can have a long life due to the balanced condition at which they operate.

The limiting condition of the present torque transmitting device is in the bearings of the link members themselves, since the forces which are carried by these bearings are not balanced with respect to each bearing, but rather will vary from a maximum to a minimum during each rotation of the associated rotary member. The maximum bearing force is determined by the torque force transmitted through the longitudinal axis of the link member and one-half of the centrifugal force of the link member. As indicated above, the longitudinal force varies as a sine wave from zero to a maximum compression back to zero then to a maximum tension and back to zero during each revolution and always acts in a direction along the longitudinal axis of the link member. On the other hand, the centrifugal force C on each bearing always acts in a direction radial with respect to the axis of rotation of the rotary member so that during one revolution of the rotary member the centrifugal force will have a component $C_L$ (see FIGURE 5) in the direction of the longitudinal axis of the link member which varies as a sine wave when plotted as shown in FIGURE 7. It will be noted that the longitudinal centrifugal force component $C_L$ is out of phase 90° with respect to the associated torque force T. That is, again considering zero degrees as the 12 o'clock position shown in FIGURE 5, the longitudinal component of the centrifugal force $C_L$ will be at a maximum at this position and acting in a direction of a tensile longitudinal force. At 90°, the $C_L$ component is equal to zero when the longitudinal force is under maximum compression. At 180°, the longitudinal component of the centrifugal force is at a maximum and acts in a direction the same as a compressive longitudinal force. At 270°, the longitudinal component of the centrifugal force again becomes zero and at 360° it becomes a maximum acting in a direction the same as a tensile longitudinal force. Thus, the longitudinal component of the centrifugal force for any one given link in any one rotation of the rotary member is a sine wave which is out of phase with the sine wave of the longitudinal force 90°.

Referring to FIGURE 7, it will be seen that by graphically adding the longitudinal torque forces T of each link member with the longitudinal component of the centrifugal force $C_L$, the total resultant longitudinal force $R_L$ acting on each link during each rotation is obtained which varies as a sine wave.

The angular position at which maximum compression and maximum tension are obtained in this resultant force will depend upon the relative magnitude of the torque force with respect to the centrifugal force. Where the maximum longitudinal torque force T has the same magnitude as the maximum longitudinal component of the centrifugal force $C_L$, the maximum resultant longitudinal force $R_L$ will occur at 135° in compression and 315° in tension.

The total resultant force acting upon each bearing is the graphic sum of the resultant longitudinal force $R_L$ and the component of the centrifugal force acting in a perpendicular direction $C_P$. The component $C_P$ of the centrifugal force is a sine wave which is 90° out of phase with the longitudinal component $C_L$. Mathematically, the total resultant force R squared is equal to $R_L$ squared plus $R_P$ square. FIGURE 8 graphically illustrates the addition of the squares of these components to obtain the square of the resultant force. The resultant force is at a maximum magnitude somewhere around 135° and 315°, again depending upon the relative magnitudes of the torque forces and centrifugal forces involved.

From the above it can be seen that the rotational speed of the torque transmitting device 10 has a most significant effect on the maximum forces applied to the link member bearings. The torque forces transmitted by the link members are a linear function of the torque forces applied, whereas the centrifugal forces applied to the bearings of the links vary in accordance with the square of the velocity, since the masses are constant. In this regard, the mass of the link member should be minimized as much as possible but still provide sufficient strength of material to withstand forces which cyclically vary between a maximum compression and a maximum tension. For this reason it is preferable to mount the bearings in the link members so that the bearing forces will be transmitted solely in a direction perpendicular to the axes and thereby minimize the application of moments within the link members themselves.

Under these conditions, the overall length of the link members measured in a direction perpendicular to their axes must be less than the distance between corresponding axes of adjacent links in order to provide proper clearance. In the preferred embodiment disclosed in FIGURES 1 through 4, each set of link members moves in a generally planar path which is perpendicular to their axes of rotation. Thus, link members limited in overall length to a size less than the distance between corresponding axes of adjacent link members is not only advantageous from a structural point of view but from a dynamic point of view as well, since it serves to provide a desirable limitation on the maximum centrifugal forces transmitted to the link member bearings.

While the device 10 described above in connection with FIGURES 1 through 8 constitutes a preferred embodiment of the invention, it will be understood that various structural changes can be made. For example, the rotary members may take various forms in addition to the disc shaped or ring shaped forms shown in FIGURES 1 through 4, as for example, a spider shaped form or the like. Preferably, each rotary member should be dynamically balanced about its axis of rotation. Moreover, while it is preferred to provide the bearings within the link members for the reasons previously described, it is within the contemplation of the present invention to provide the bearings in the rotary members and to fix the shafts to the link members, as shown in FIGURE 9 wherein corresponding parts are indicated by corresponding primed numerals. The device 10' of FIGURE 9, differs from the device 10 in the provision of bearings 52 in the intermediate rotary member 28 which is arranged to receive a relatively large stub shaft 54 connected with each of the link members 20'. Each large stub shaft 54 is provided with an opening 56 for receiving a stub shaft 58 fixed to the associated link member 40'. Alternatively, as shown in FIGURE 10, a single bearing 60 secured to the intermediate rotary member 28 may receive the adjacent ends of stub shafts 62 and 64 of equal diameter fixed to the link members 20' and 40' respectively.

Referring now more particularly to FIGURES 11 through 14, there is disclosed therein a torque transmitting device 70 which is made up of three rotary members 72, 74 and 76, and two sets of at least three link members 78 and 80, journaled in sleeve bearings 82, 84 and 86, fixed to the rotary members 72, 74 and 76 respectively. Each link member is in the form of two integrally connected axially offset shaft sections, as clearly shown in FIGURE 14. The manner in which the intermediate rotary member 74 is rotatably connected with the link members 78 and 80 illustrates a further variation of the present invention. While it would be possible to provide an arrangement similar to that shown in FIGURE 9 wherein the link members of one set are rotatably connected with the intermediate rotary member about concentric axes of rotation with respect to the link members of the other set, it is preferred in the integrated shaft construction of the link members to space the rotational axes of one set of link members in axially staggered relation within the rotational axes of the other set of link members.

In general it can be stated that a torque transmitting device constructed in accordance with the principles of the present invention provides a means for transmitting torque in situations where dual universal joint and splined shaft assemblies were heretofore used. The present torque transmitting device has the following advantages.

First, it is capable of providing for a wider range of movement between the input axis of rotation and the output axis of rotation within a given axial distance or, stated differently, the present coupling is capable of transmitting torque without binding within a range in which the angle of the axis of the splined shaft of a comparable dual universal assembly would bind.

Second, the present torque transmitting device maintains a constant angular velocity throughout and the torque forces and centrifugal forces involved are balanced so that there is no imbalance forces transmitted to the bearings of the input rotary member and the output rotary member. With a conventional dual universal assembly each universal transmits the rotational forces in a sinuously variable manner which may set up vibrational forces within the splined shaft itself resulting in the application of axial forces to the bearings of the input and output shafts.

Third, the present torque transmitting device is constructed of rotary members, link members, bearings and shafts which are of conventional construction or lend themselves to convenient fabrication. The limiting factor from a design standpoint is in the bearings utilized. Maintenance can be reduced to a minimum by utilizing self-lubricating sealed bearings where required or desired. From a manufacturing standpoint, accuracy is required in the location of the rotational axes of the link members. One way of achieving the close tolerances which are needed is to provide eccentric sleeve bearings, that is, sleeve bearings in which the center of the exterior diameter is offset from the center of the interior diameter very slightly to provide for differences in manufacturing tolerances. By fixing the sleeve bearing within the link member at different angular positions, a precise spacing between the interior axes of rotation can be obtained in this fashion. Where needle bearings, ball bearings or roller bearings are used, an eccentric cylindrical shim construction may be utilized.

In the preferred embodiment of the torque transmitting device shown in FIGURES 1 through 4, the distance between the axes of the link members of one set of links is equal to the distance between the axes of the link members of the other set. With such an arrangement, the range of relative movement is within a circular area equal to twice the distance between the axes of a link member. Consequently within this range of movement the axis of the input rotary member can be moved through a position of alignment with the axis of the output rotary member. In this position of axial alignment, there is presented the possibility that the intermediate rotary member, due to friction in the bearings, may tend to orbit about this coincident axis. For this reason, it is desirable to prevent movement of the input and output rotary members into this axially aligned position. For example, where the output shaft has a linear transverse motion with respect to the input shaft, it is desirable to provide an offset between the input axis and the linear path of movement of the output axis as indicated by the line A in FIGURE 15 so that the alignment of the two axes does not take place.

Figure 17:
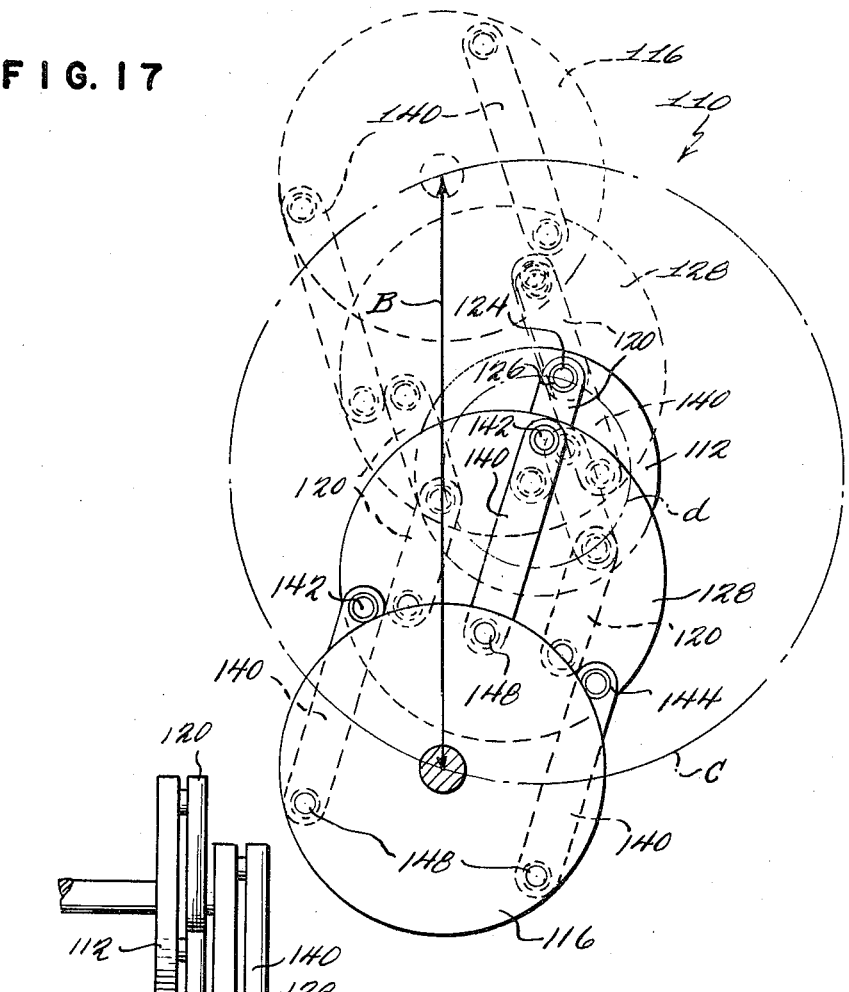
FIGURE 17 is a front elevational view of still another modified form of the torque transmitting device embodying the principles of the present invention.
Figure 18:
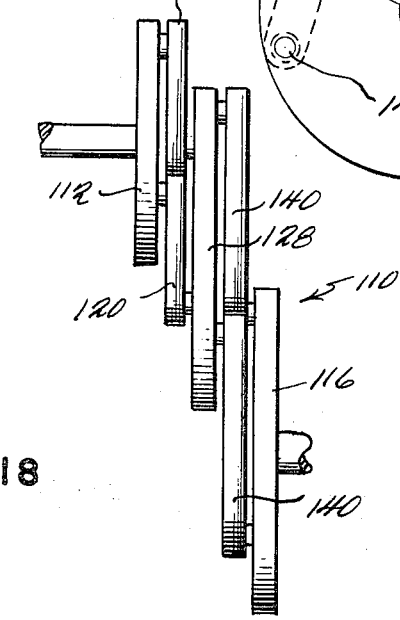
FIGURE 18 is a side elevational view of the torque transmitting device shown in FIGURE 17.

Alternatively, where this offset relationship is presented, it may be desirable to increase the distance between the axes of the link members of one set of link members over the distance between the axis of the other set of link members an amount equal to the offset. Such an embodiment is shown in FIGURES 17 and 18.

In this embodiment in which the torque transmitting device is designated by the numeral 110, corresponding parts to the device 10 have been given corresponding numerals with the prefix 1. The device 110 is capable of providing the same rectilinear relative movement as the line A as indicated by the line B. The important difference to note is that the link members 120 are shorter in distance between axes than the link members 140 and the diameters of the intermediate and output rotary members 128 and 116 are increased proportionately over the diameter of the input rotary member 112. Thus a characteristic of the present invention is that the right cylindrical plane within which the axes of any one set of link members is disposed must be of equal diameter, however, the equal diameter right cylindrical planes associated with one set of link members may vary in size with respect to the equal diameter right cylindrical planes of another set.

Moreover, it should be noted that the device 110 will not provide relative transverse movement completely throughout a circular area having a radius equal to the distance between the axes of a link member 120 plus the distance between the axes of a link member 140. Rather the area of relative transverse movement is a ring-shaped or annular area as indicated by circles c and d shown in phantom in FIGURE 17. Where such full range of movement is desired link members having equal distance between axes in both sets are utilized and it is preferred to utilize restraining device to prevent orbiting when the output axis and input axis are in alignment.

Figure 15:
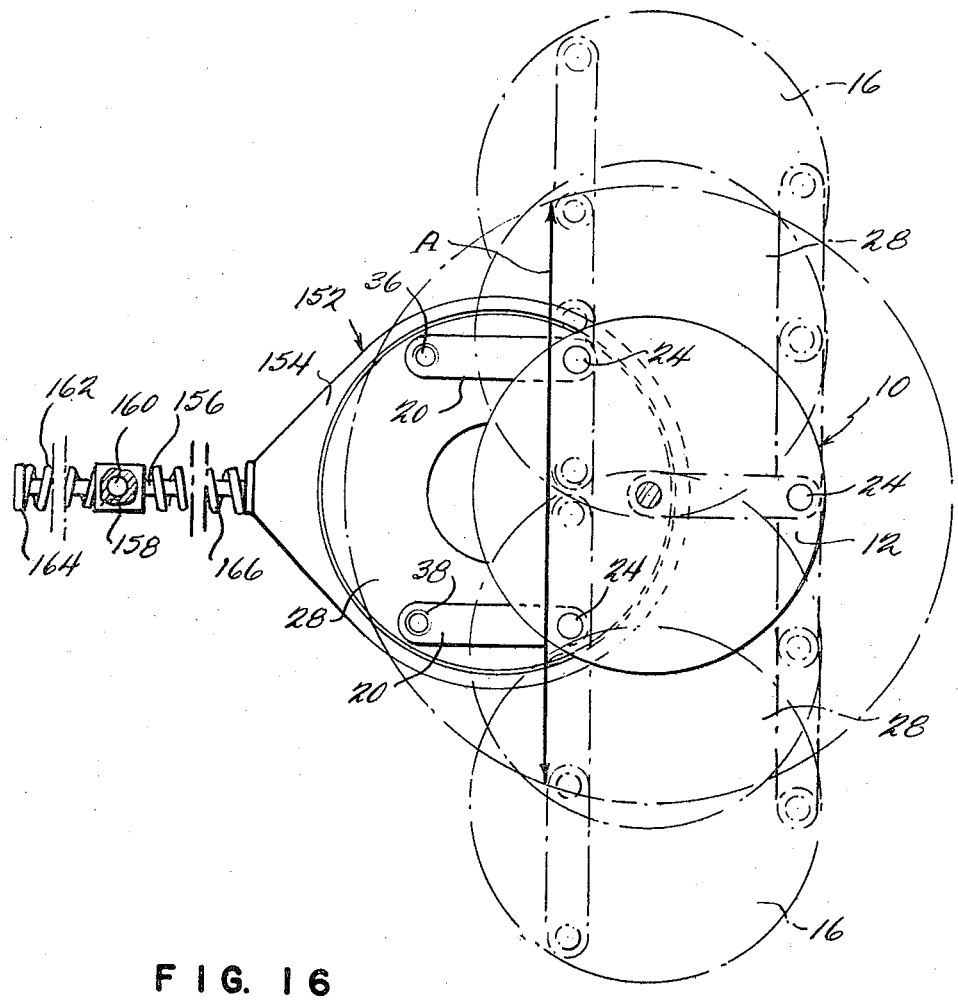
FIGURE 15 is an elevational view of a torque transmitting device embodying principles of the present invention showing a restraining device utilized therewith for preventing orbiting of the intermediate rotary member when the input and output rotary members are in alignment.
Figure 16:
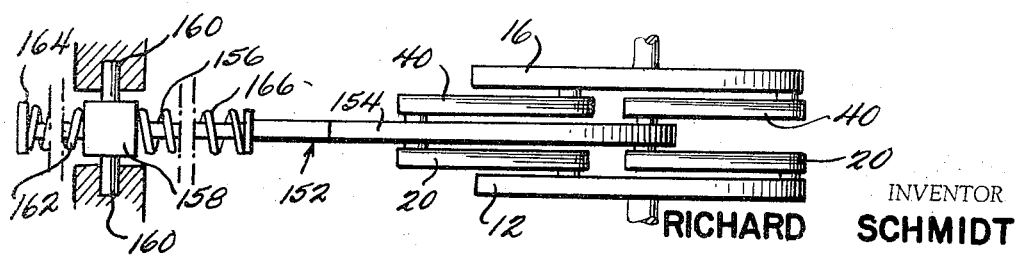
FIGURE 16 is a front elevational view of the torque transmitting device shown in FIGURE 15.

FIGURES 15 and 16 illustrate one embodiment of such a restraining device, generally indicated at 152. The device 152 includes a ring 154 which is rotatably mounted to the peripheral surface of the intermediate rotary member 28. Fixedly secured to the ring and extending outwardly therefrom is a shaft member 156. Slidably mounted on the shaft member is a sleeve 158 having a pair of opposed trunnions extending outwardly therefrom which are pivotally supported by a structure, schematically illustrated at 160, fixed with respect to the stationary axis of the device, about an axis parallel to the axis of the rotary member 28. The trunnion sleeve and shaft permits the ring to move with the intermediate rotary member 28 in any position of adjustment and there is provided a compression spring 162 on the outer end portion of the shaft member 156 between a washer 164 on the end of the shaft member and the trunnioned sleeve. A second compression spring 166 is mounted on the inner end portion of the shaft member between the sleeve 158 and ring 154. The springs are of a strength just sufficient to overcome any friction forces which would tend to orbit the intermediate member 28 when the axis of the input and output rotary members are aligned.

Figure 19:
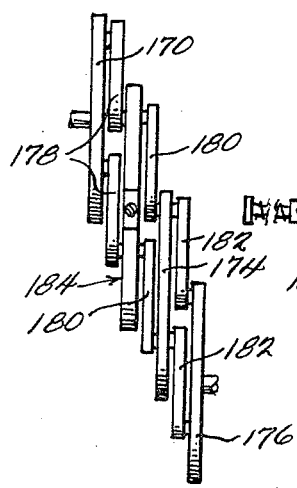
FIGURE 19 is a side elevational view of still another modified form of a torque transmitting device embodying the principles of the present invention.
Figure 20:
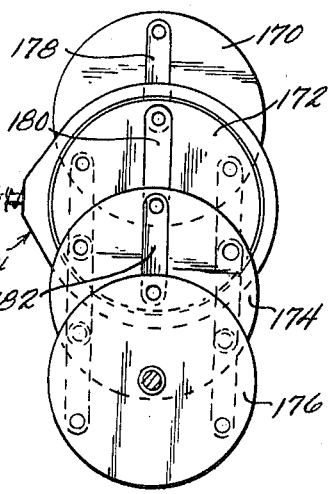
FIGURE 20 is a front elevational view of the torque transmitting device shown in FIGURE 19.
Figure 21:
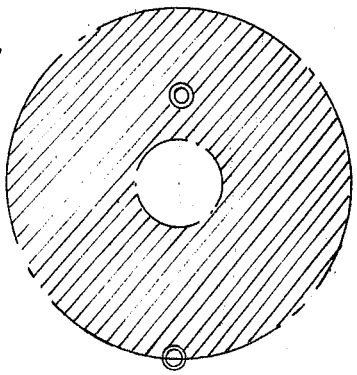
FIGURE 21 is a schematic view illustrating the area of relative transverse movement between the axis of the input rotary member and the axis of the output rotary member of the torque transmitting device shown in FIGURES 19 and 20.

It will be understood that where it is desired to provide an increased area of relative movement between the input axis and output axis without an increase in the diameter of the rotary members it is preferable to provide more than three rotary members and more than two sets of link members. For example, as shown in FIGURES 19 through 21, four rotary members, 170, 172, 174 and 176 may be provided with three sets of link members, 178, 180 and 182. Under these circumstances it is desirable to provide a restraining device 184 for at least one of the intermediate rotary members 172 and, depending upon the particular range of movement desired a restraining device for each intermediate rotary member may be provided to prevent orbital movement.

Figure 22:
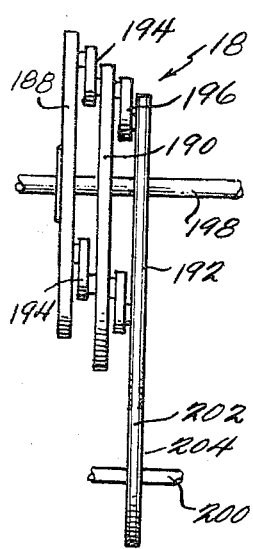
FIGURE 22 is a view similar to FIGURE 19 showing still another modified form of a torque transmitting device embodying the principles of the present invention.
Figure 23:
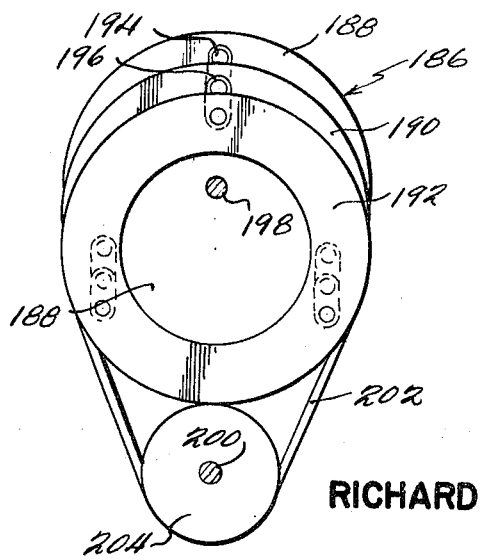
FIGURE 23 is a view similar to FIGURE 20 of the torque transmitting device shown in FIGURE 22.
Figure 24:
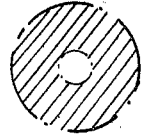
FIGURE 24 is a view similar to FIGURE 21 relating to the torque transmitting device shown in FIGURES 22 and 23.

In the embodiments previously described, the structural arrangement is such as to prevent the utilization of the torque transmitting device except between the ends of the rotary members to be connected. In FIGURES 22 through 24, there is disclosed a torque transmitting device 186 embodying the principles of the present invention, including rotary members 188, 190 and 192 interconnected by sets of link members 194 and 196, in which the input rotary member 188 is connected to a shaft 198 intermediate the ends thereof which shaft extends through the rotary members 190 and 192. The output rotary member 192 is connected to a parallel shaft 200 through a connection with the periphery thereof. It will be understood that such connection may be effected by gears, a sprocket and chain assembly or the like, but, as shown, this connection is effected by means of a belt 202 engaged in a suitable groove on the periphery of the output rotary member 192 and over a pulley 204 fixed to the shaft 200. Due to the presence of the shaft 198 within rotary members 190 and 192, the area of relative transverse movement is relatively small as shown in FIGURE 24.

Figure 25:
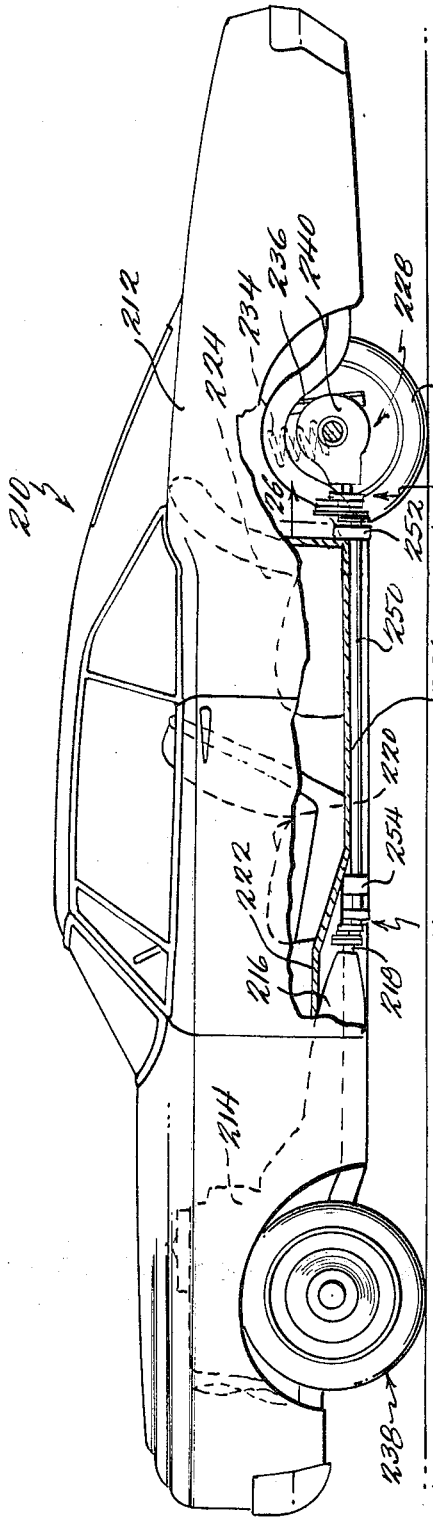
FIGURE 25 is a side elevational view of an automotive vehicle torque transmission system embodying the principles of the present invention, with parts broken away for purposes of clearer illustration.
Figure 26:
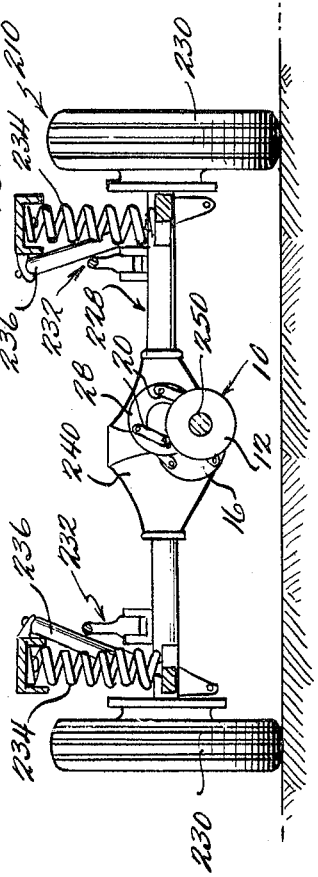
FIGURE 26 is a cross-sectional view taken along the line 26—26 of FIGURE 25.
Figure 27:
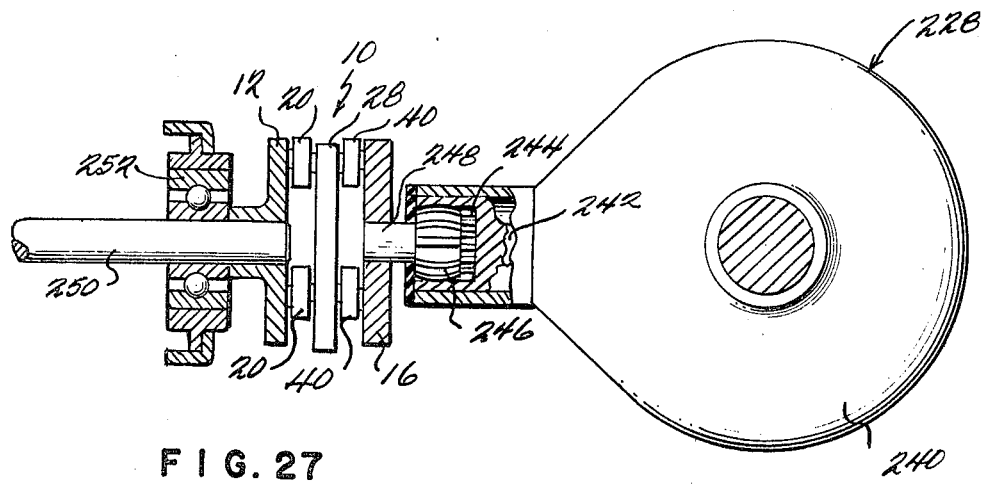
FIGURE 27 is an enlarged fragmentary vertical sectional view illustrating the connection of the torque transmitting device of the present invention between a first rotational drive shaft and the input shaft of the differential unit of the rigid rear axle assembly of the vehicle shown in FIGURE 25.

Referring now more particularly to FIGURES 25 through 27, there is shown therein an automotive vehicle, generally indicated at 210, embodying the principles of the present invention. The vehicle, as shown, is illustrative of the overwhelming majority of the automobiles produced in this country, modified in accordance with the principles of the present invention. The modifications of the present invention permit a substantial reduction, if not elimination, of the rear floor tunnel which has heretofore been provided in conventional automobiles within the last several number of years. In accordance with the principles of the present invention, the rear floor tunnel is substantially reduced, if not eliminated, through modification of the drive shaft assembly of the vehicle and without in any way effecting the suspension of the rear axle assembly of the vehicle except insofar as this suspension is improved due to the modifications in drive shaft assembly.

The vehicle 210 shown in the drawings includes a conventional frame 212 which, in the context of the present application, comprehends within its meaning both the chassis and body of the vehicle construction in any known manner. Mounted on the forward portion of the frame is a motor 214 of any conventional construction, and a transmission 216 of any desirable conventional construction is mounted to the rear of the motor 214 and has an output shaft 218 extending rearwardly therefrom. The frame of the vehicle provides a forward passenger compartment 220 having a floor portion 222 disposed rearwardly of the motor 214 and above the transmission 216. In the embodiment shown, the forward floor portion 222 is provided with a tunnel or hump to receive the rear end portion of the transmission and it will be understood that in those constructions where the rearward portion of the transmission terminates forwardly of the front floor portion of the frame that this tunnel likewise can be reduced, if not eliminated, in accordance with the principles of the present invention.

The frame 212 also provides a rear passenger compartment 224 having a lower floor portion 226. Disposed rearwardly of the rearward floor portion 226 is a rigid rear axle assembly, generally indicated at 228, of conventional construction and having a pair of rear wheels 230 drivingly connected to opposite ends thereof. The rearward portion of the frame 212 is resiliently suspended on the rear axle assembly 228 in any conventional fashion for relative generally vertical movement. As shown, the suspension includes a four link torque arm arrangement, generally indicated at 232, coil suspension springs 234, and conventional shock absorbers 236. It will also be understood that the vehicle includes in conventional fashion a steerable front wheel assembly, generally indicated at 238.

The rear axle assembly 228 includes a centrally located differential unit 240 of conventional construction through which the rear wheels 230 are driven. As best shown in FIGURE 25, the differential unit 240 includes a forwardly extending input shaft 242 having its forward portion provided with an interior spline 244. The interior spline 244 cooperates with the exteriorly arcuately splined rear end 246 of a stub shaft 248 fixedly connected with the output rotary member 16 of a torque transmitting device 10 such as previously described in detail. The input rotary member 12 of the device 10 is connected to the rearward end of a drive shaft 250 which is mounted on the frame of the vehicle in a position below the floor portions thereof for rotational movement about a fixed axis which is preferably laterally offset a slight distance from the axis of rotation of the input shaft of the differential unit. As shown, the drive shaft 250 is journaled at its rearward end by suitable bearings 252 carried by the frame and at its forward end by suitable bearings 254. Any suitable means may be provided for drivingly connecting the forward end of the drive shaft 250 with the output shaft 218 of the transmission. As shown, a torque transmitting device 10 is utilized in this connection, although it will be understood that a gear train or similar unit may be utilized here, if desired.

It can be seen that the rearward torque transmitting device 10 will accommodate the relative vertical movement between the rear axle assembly 228 and the frame 212 of the vehicle, the arcuate spline connection 244 and 246 accommodating any relative angular movement. By mounting the drive shaft 250 on the frame for rotation about a fixed axis it can be located at a position below the rear floor portion 226 so as to materially reduce, if not eliminate entirely, the tunnel or hump heretofore provided.

Figure 28:
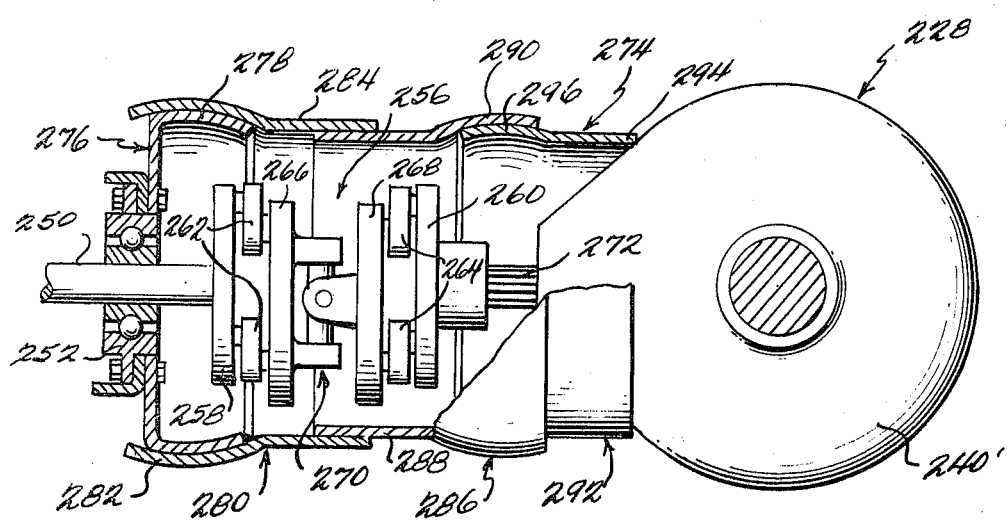
FIGURE 28 is a view similar to FIGURE 27 illustrating a modified form of the connection.

Referring now more particularly to FIGURE 28, there is disclosed therein a modified form of a rearward torque transmitting device 256 in which any angular movement between the rear axle assembly and the frame of the vehicle is accommodated within the device itself. The torque transmitting device 256 includes input and output rotary members 258 and 260 and two sets of link members 262 and 264 connected thereto, however, the usual intermediate rotary member is replaced by a pair of intermediate rotary members 266 and 268, each being connected in the manner previously described with one set of link members. The two intermediate rotary members 266 and 268 are interconnected by means of a universal joint 270. The output rotary member 260 is splined to a straight splined input shaft 272 of a differential unit 240'. In this way, the torque transmitting device 256 not only accommodates relative vertical movement between the drive shaft 250 and input differential shaft 272, but relative angular movement between the same as well.

While it is contemplated that the torque transmitting device 10, as shown in FIGURES 25 through 27, would embody sealed bearings and therefore would not require the provision of a housing, a suitable housing, generally illustrated at 274 which may be used therewith is shown in FIGURE 28. As shown, the housing 274 includes a first section 276 fixed to the frame of the vehicle and having a frusto-spherical portion 278 extending rearwardly therefrom. A second housing section 280 has a forward frusto-spherical portion 282 engaged over the frusto-spherical portion 278 of the first housing section 276 and a rearward cylindrical portion 284. A third housing section 286 includes a forward cylindrical portion 288 engaged within the rearward cylindrical portion 284 of the second section 280 and a rearward frusto-spherical portion 290. Finally, the housing includes a fourth section 292 having a rearward cylindrical portion 294 fixed to the differential unit 240 of the rear axle assembly 228 and a forward frusto-spherical portion 296 engaged within the rearward frusto-spherical portion 290 of the third housing section 286. It will be seen that the housing sections will articulate with respect to each other in response to the relative vertical movement between the rear axle assembly 228 and the frame of the vehicle 212.

The most dramatic advantage of the automotive vehicle torque transmission system described above in connection with FIGURES 25 through 27 is in the substantial reduction or elimination of the rear floor tunnel or hump. An attendant advantage resides in the fact that the drive shaft 250 is completely supported by the frame and becomes a part of the sprung mass of the vehicle. The weight of the torque transmitting device 10 will be carried equally by the frame and the rear axle assembly so that the total weight of the rear axle assembly is materially reduced and it is an advantage to maintain the unsprung mass to a minimum while still maintaining a desirable suspension construction.

In general, it can be stated that a dual universal splined shaft assembly could not be utilized in lieu of the torque transmitting device 10 because the splined shaft would have to operate at excessive angles where binding would occur. Thus, while other types of torque transmitting devices may be utilized in lieu of the device 10, such devices must be capable of accommodating the required torque transmission within the axial space between the rear floor portion and the differential unit. In the combination, the torque transmitting device 10 is preferred.

Figure 29:
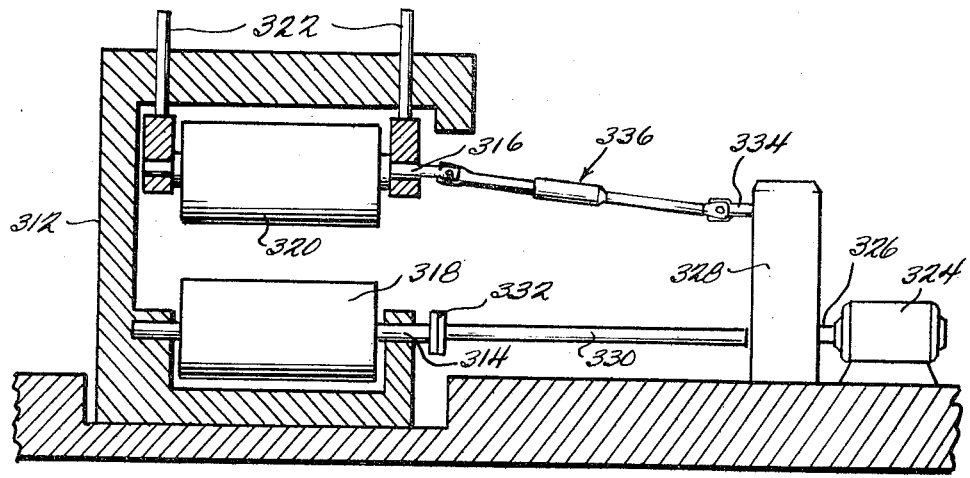
FIGURE 29 is a generally schematic view illustrating the conventional prior art manner in which the drive of a vertically movable roller in a rolling mill is accomplished.

From the above it can be seen that the torque transmitting device of the present invention is capable of achieving results in a torque transmitting system which can not be accomplished by a conventional dual universal splined shaft assembly. In a like manner, the torque transmitting device of the present invention may likewise be utilized in other torque transmitting systems which suffer from disadvantages because of the inherent limitations occasioned by the use of dual universal splined shaft assemblies. For example, in FIGURE 29, there is shown a somewhat schematic illustration of a conventional prior art torque transmitting system for a rolling mill assembly, generally indicated at 310. The assembly includes the frame 312 within which shafts 314 and 316 of a pair of vertically spaced rollers 318 and 320 are suitably journaled. The upper roller 320 is mounted for vertical translational movement in addition to its rotary movement about its axis and for this purpose includes a conventional vertically movable mounting assembly schematically illustrated in the drawings as a pair of rods 322. Each of the rollers is power driven and for this purpose there is provided a motor 324 having an output shaft 326 suitably connected to the input shaft of a gear box 328 of conventional construction. The gear box includes a lower output shaft 330 which is suitably coupled as by a coupling 332 to the shaft 314 of the lower roller 318. The gear box 328 also includes an upper output shaft 334 which is connected with the shaft 316 of the upper roller 320 through a dual universal splined shaft assembly, generally indicated at 336.

Figure 30:
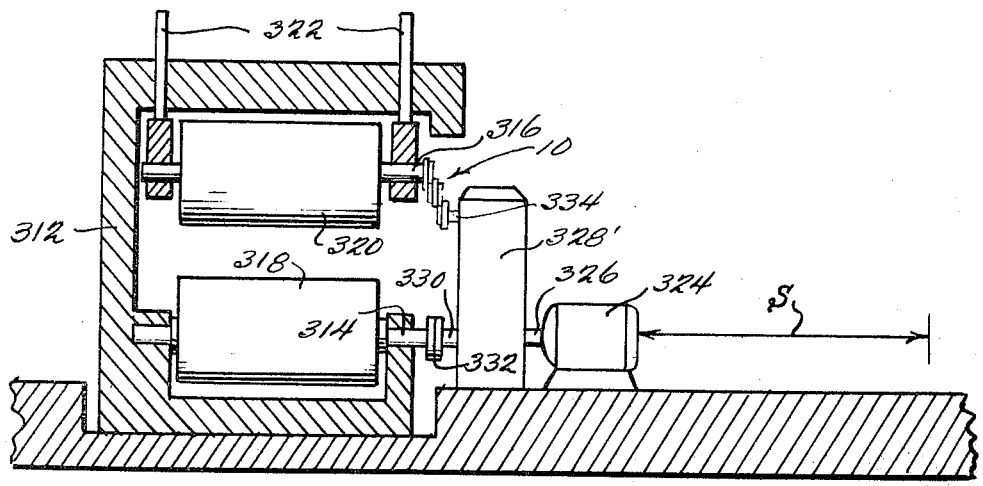
FIGURE 30 is a view similar to FIGURE 29, modified in accordance with the principles of the present invention.

Referring now to FIGURE 30, in accordance with the principles of the present invention, a torque transmitting device 10 is connected between the shaft 316 of the vertically movable roller 320 and the output shaft of a gear box 328' so as to transmit the motor torque to the roller while at the same time accommodating such vertical movement. Preferably the gear box 328' is modified so that the axis of the output shaft 334' is horizontally offset from the axis of the roller shaft 316. It will be noted that with this arrangement, the motor 324 can be moved substantially closer to the roller frame, thus effecting a substantial saving in floor space, as indicated at S in FIGURE 30.

Thus, in accordance with the principles of the present invention, the torque transmitting device may be utilized in any number of different combinations to secure distinct advantages in situations where the saving of axial space is desirable and dual universal splined shaft assemblies have been heretofore used to disadvantage. Further examples of such combinations would include the utilization of a torque transmitting device to drive the rear wheels of a vehicle in a situation where each rear wheel is independently suspended. Likewise, the torque transmitting device can be utilized in an independent front wheel suspension drive. The torque transmitting device would have utilization in a helicopter transmitting system and would be particularly useful in a gear reduction transmission in which the shaft of one set of cooperating gears could be mounted for movement in a direction transverse to its axis so that intermeshing of the gears would take place radially, rather than axially or in addition to the usual axial engagement.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A torque transmitting device for transmitting torque from a driving rotary means to a driven rotary means which accommodates relative transverse movement between the axes of said driving and driven rotary means during the rotational movement thereof comprising a first rotary member having a first axis of rotation and adapted to be drivingly connected with the driven rotary means to be rotated thereby about said first axis, a second rotary member having a second axis of rotation and adapted to be drivingly connected with the driven rotary means to rotate the same in response to rotational movement of said second rotary member about said second axis and means operatively connected between said first and second rotary members and having a substantially constant resultant centrifugal force substantially equal to zero during operation and a substantially constant resultant torque transmitting force substantially equal to zero with respect to said first and second axes of rotation during operation for transmitting the rotational movement of said first rotary member about said first axis to a rotational movement of identical angular velocity of said second rotary member about said second axis while permitting relative transverse parallel movement between the axes of rotation of said rotary members, said last-mentioned means comprising an intermediate rotary member disposed between said first and second rotary members and having a third axis of rotation parallel with said first and second axes of rotation, a first series of at least three link members of substantially identical construction disposed in parallel relation with respect to each other and having their ends rotatably connected respectively with said first rotary member and said intermediate rotary member about axes spaced equally within right cylindrical planes of equal diameter respectively concentric with said first axis and said third axis, the link members of said first series having a dimension measured in a direction perpendicular to their axes less than the distance between the corresponding axes of adjacent link members and a second series of link members of substantially identical construction disposed in parallel relation with respect to each other and having their ends rotatably connected respectively with said intermediate rotary member and said second rotary member about axes spaced equally within right cylindrical planes of equal diameter respectively concentric with said third axis and said second axis, the link members of said second series having a dimension measured in a direction perpendicular to their axes less than the distance between corresponding axes of adjacent link members, and including means for mounting said first and second rotary members for relative transverse movements through a range of positions which prevents an alignment of said axes of rotation of said first and second rotary members while said rotary members are being rotated.

2. A torque transmitting device as defined in claim 1 wherein said right cylindrical planes concentric with said first and third axes are of a diameter equal to the diameter of said right cylindrical planes concentric with said third and second axes.

3. A torque transmitting device as defined in claim 1 wherein each of said link members comprises a straight link disposed in a plane perpendicular to the associated axes of rotation and having bearings mounted in opposite ends thereof and wherein each of said straight links are rotatably connected with the associated rotary members by means of shaft portions fixed to said rotary members and journaled in said bearings.

4. A torque transmitting device as defined in claim 1 wherein each of said link members includes a pair of rigidly interconnected shaft portions journaled in the associated rotary members.

5. A torque transmitting device as defined in claim 4 wherein the axes of said shaft portions are spaced apart a distance less than the exterior radius of each shaft portion.

6. In an automotive vehicle including a rigid rear axle assembly having rotatable rear wheels operatively connected to the ends thereof and an intermediate differential unit through which said rear wheels are driven, a vehicle body, means resiliently mounting the rear portion of said vehicle body on said rear axle assembly for relative vertical movement with respect thereto, a motor carried by the front portion of said vehicle body, the improvement comprising a driven shaft mounted on said vehicle body for rotation about an axis fixed with respect to said vehicle body, said drive shaft extending beneath floor portions of said body in a generally fore and aft direction, means for selectively drivingly connecting the forward end of said drive shaft with said motor, and torque transmitting means operatively connected between the rear end of said drive shaft and said differential unit for transmitting high speed-high torque rotational movement from said drive shaft to said differential unit while accommodating the relative vertical movement of the differential unit with respect to said vehicle body wherein said torque transmitting means comprises a first rotary member drivingly connected with the rear end of said drive shaft for rotation therewith about a first axis of rotation, a second rotary member drivingly connected with said differential unit and having a second axis of rotation horizontally offset relative to said first axis of rotation and movable vertically with respect to said first axis in response to the vertical movement of said rear axle assembly with respect to said body, and means operatively connected between said first and second rotary members and having a substantially constant resultant centrifugal force substantially equal to zero during operation and a substantially constant resultant torque transmitting force substantially equal to zero with respect to said first and second axes of rotation during operation for transmitting the rotational movement of said first rotary member about said first axis to a rotational movement of identical angular velocity of said second rotary member about said second axis while permitting relative transverse parallel movement between the axes of rotation of said rotary members, said last-mentioned means comprising an intermediate rotary member disposed between said first and second rotary members and having a third axis of rotation parallel with said first and second axes of rotation, a first series of at least three link members of substantially identical construction disposed in parallel relation with respect to each other and having their ends rotatably connected respectively with said first rotary member and said intermediate rotary member about axes spaced equally within right cylindrical planes of equal diameter respectively concentric with said first axis and said third axis, the link members of said first series having a dimension measured in a direction perpendicular to their axes less than the distance between the corresponding axes of adjacent link members and a second series of link members of substantially identical construction disposed in parallel relation with respect to each other and having their ends rotatably connected respectively with said intermediate rotary member and said second rotary member about axes spaced equally within right cylindrical planes of equal diameter respectively concentric with said third axis and said second axis, the link members of said first and second series having a dimension measured in a direction perpendicular to their axes less than the distance between corresponding axes of adjacent link member.

7. The torque transmitting device of claim 1 wherein the link members of one of said series have a dimension measured in a direction perpendicular to their axes unequal to the corresponding dimension of the link members of the other of said series of link members.

8. The torque transmitting device of claim 1 wherein said intermediate rotary member is supported only by said first and second series of link members, whereby said intermediate rotary member floats freely for a range of transverse movements limited only by said first and second series of link members.

9. The torque transmitting device of claim 1 and including means for moving at least one of said first and second rotary members transversely relative to the other of said rotary members.

10. The torque transmitting device of claim 1 and including a second intermediate rotary member disposed between said first rotary member and said first named intermediate rotary member with said first series of link members being connected between said intermediate rotary members, and said second intermediate rotary member having a fourth axis of rotation parallel with said first, second and third axes of rotation, a third series of at least three link members of substantially identical construction disposed in parallel relation with respect to each other and having their ends rotatably connected respectively with said first rotary member and said second intermediate rotary member about axes spaced equally within right cylindrical planes of equal diameter respectively concentric with said first and said fourth axis.

References Cited by the Examiner

UNITED STATES PATENTS

| | | | |
|---|---|---|---|
| 268,807 | 12/1882 | Landis | 64—31 X |
| 327,741 | 10/1885 | True | 74—68 |
| 1,862,220 | 6/1932 | Johnson | 64—31 |
| 2,082,826 | 6/1937 | Frisby | 180—73 |
| 2,340,149 | 1/1944 | Slack | 180—73 |
| 3,106,078 | 10/1963 | Turinsky | 64—31 |

FOREIGN PATENTS

| | | |
|---|---|---|
| 788,103 | 7/1935 | France. |
| 4,395 | 1891 | Great Britain. |
| 5,296 | 1908 | Great Britain. |

OTHER REFERENCES

Rauh: Praktische Getriebelechre, Springer, 1951. Pages V, VI, 16, 17, 30, 31, 34, 35, 42, 43, 52, 53, 56. (Copy of cited pages in Group 340, class 64 subclass 19.)

BROUGHTON G. DURHAM, *Primary Examiner.*

ROBERT C. RIORDON, *Examiner.*

H. C. COE, *Assistant Examiner.*